(12) United States Patent
Indirabhai (10) Patent No.: US 7,925,285 B2
(45) Date of Patent: *Apr. 12, 2011

(54) SYSTEM AND METHOD FOR SYNCHRONIZING WIRELESS COMMUNICATION DEVICES

(75) Inventor: Jyothis Indirabhai, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/689,628

(22) Filed: Jan. 19, 2010

(65) Prior Publication Data

US 2010/0120458 A1    May 13, 2010

Related U.S. Application Data

(63) Continuation of application No. 09/935,082, filed on Aug. 21, 2001, now Pat. No. 7,650,158.

(51) Int. Cl.
*H04B 7/005* (2006.01)

(52) U.S. Cl. .......................... 455/502; 370/338; 375/354

(58) Field of Classification Search .................. None
See application file for complete search history.

(56) References Cited

U.S. PATENT DOCUMENTS

| 6,757,318 | B1 | 6/2004 | Ziegler et al. |
| 2002/0031196 | A1* | 3/2002 | Muller et al. ............ 375/354 |
| 2002/0075940 | A1 | 6/2002 | Haartsen |
| 2002/0114303 | A1 | 8/2002 | Crosbie et al. |
| 2002/0131398 | A1 | 9/2002 | Taylor |

OTHER PUBLICATIONS

Specification of the Bluetooth System, Wireless Connections Made Easy v. 1.0B, Dec. 1st 1999, pp. 1-1080, Specification vol. 1.

* cited by examiner

*Primary Examiner* — Phuoc Doan
(74) *Attorney, Agent, or Firm* — McAndrews, Held & Malloy, Ltd.

(57) ABSTRACT

According to the present invention, Bluetooth master device offset information is determined and distributed among the master devices within a Bluetooth network. The system either provides an offset to each master device or determines master device offsets and distributes this information to master devices within the system to allow or efficient hand-offs of a slave between master devices.

34 Claims, 9 Drawing Sheets

SYSTEM AND METHOD FOR SYNCHRONIZING WIRELESS COMMUNICATION DEVICES

CROSS-REFERENCE TO RELATED APPLICATIONS/INCORPORATION BY REFERENCE

The present application is a CONTINUATION of U.S. application Ser. No. 09/935,082, filed Aug. 21, 2001, now U.S. Pat. No. 7,650,158 B2. The above-identified application is hereby incorporated herein by reference in its entirety.

BACKGROUND

1. Field

The present invention relates generally to wireless communications, and more specifically to synchronizing the timing of wireless communication devices.

2. Background

In today's electronically interconnected world, the normal complement of electronic equipment in the home or business includes devices that are connected to one another in different ways. For example, many desktop computer systems have a central processing unit (CPU) connected to a mouse, a keyboard, a printer and so on. A personal digital assistant (PDA) will normally connect to the computer with a cable and a docking cradle. A television may be connected to a VCR and a cable box, with a remote control for all three components. A cordless phone connects to its base unit with radio waves, and it may have a headset that connects to the phone with a wire. In a stereo system, the CD player, tape player and record player connect to the receiver, which connects to the speakers. These connections can be difficult to install and maintain, particularly for the lay user.

Alternatives to these conventional approaches to connectivity have been proposed. Bluetooth™ (BT) is a computing and telecommunications industry specification for connectivity that is both wireless and automatic, as described in *The Specification of the Bluetooth System*, Version 1.1, Feb. 22, 2001, ("the BT specification"), which is incorporated herein by reference. BT allows any sort of electronic equipment—from computers and cell phones to keyboards and headphones—to make its own connections, without wires, cables or any direct action from a user. Because BT connections are wireless, offices can be designed without regard to cable placement and users can travel with portable devices without having to worry about carrying a multitude of cables. These connections can be established automatically, where BT devices find one another and form a connection without any user input at all.

BT requires that a low-cost microchip transceiver be included in each device. The BT microchip transceiver communicates on a frequency of 2.45 GHz, which has been set aside by international agreement for the use of industrial, scientific and medical devices (ISM). In addition to data, up to three voice channels are available. Each BT device has a unique 48-bit device address from the Institute of Electrical and Electronics Engineers 802 standard. Connections can be point-to-point or multi-point. Data can be exchanged at a rate of 1 megabit per second (up to 2 Mbps in the second generation of the technology).

A number of common consumer devices also take advantage of the same RF band. Baby monitors, garage-door openers and some cordless phones all make use of frequencies in the ISM band. The BT design employs various techniques to reduce interference between these devices and BT transmissions. For example, BT avoids interfering with other systems by sending out relatively weak signals of 1 milliwatt. By comparison, some cell phones can transmit a signal of 3 watts. The low power limits the range of a BT device to about 10 meters, thereby reducing the probability of interference with other devices.

BT also employs a spread-spectrum frequency hopping scheme to further reduce interference and increase capacity. BT devices use 79 randomly chosen frequencies within a designated range, changing from one to another on a regular basis 1,600 times every second. The random frequency hopping pattern makes it unlikely that two BT transmitters will be on the same frequency at the same time, thus reducing the probably of BT devices interfering with one another. This technique also minimizes the risk that other non-BT devices such as portable phones or baby monitors will disrupt BT devices since any interference on a particular frequency will last only a fraction of a second.

When BT devices come within range of one another, an electronic conversation takes place to determine whether they have data to share or whether one needs to control the other. Once the conversation has occurred, the devices form a Personal-Area Network (PAN) or "piconet". A piconet may link devices located throughout a room, such as a home entertainment system, or devices much closer together such as a mobile phone on a belt-clip and a headset, or a computer, mouse, and printer. Once a piconet is established, the connected devices randomly hop frequencies in unison to communicate with one another and avoid other piconets that may be operating nearby.

In the piconet configuration, the connected devices act as either masters or slaves, and one master device may control multiple slaves, and, indeed, a master device may, itself, be a slave to another master device.

This master-slave configuration requires that the slave react subserviently to its master device, and one way that this occurs is through establishing appropriate timing. Specifically, a slave device must synchronize its timing with that of its master. Thus, if two slaves, for example, are in communication with the same master device, they both synchronize their timing with that of the master device.

If, however, a slave moves from one master device to another (referred to hereinafter as "handoff"), the slave device must synchronize its timing with the timing of its new master device. Since the slave has been communicating with the old master using the old master's timing, and is familiar only with this timing, the new master device must "speak" to the slave in the old master's timing. The new master device does this to notify the slave of the new master's timing information so that the slave may synchronize to it. In order for this to happen, the new master device needs to obtain the old master device's timing. The BT Specification, however, does not specify a procedure for providing the timing from one master device to another to effectuate an efficient handoff.

There is therefore a need for an improved system and method for providing timing information to master devices so that handoffs can be accomplished efficiently.

SUMMARY

Embodiments disclosed herein address the above stated needs by providing a system and method for the distribution of BT master device timing offset information within a BT system. According to a first aspect of the present invention, BT master device local clocks are generated based on a free-running global clock and timing offset information. According to a second aspect of the present invention offset information is distributed among BT master devices that generate their own local clocks.

DETAILED DESCRIPTION

Overview

The present invention relates generally to clock synchronization of BT devices. According to various example embodiments of the present invention, the timing information of BT master devices is distributed to other master devices within the system to facilitate slave device handoff between master devices.

Figure 1:
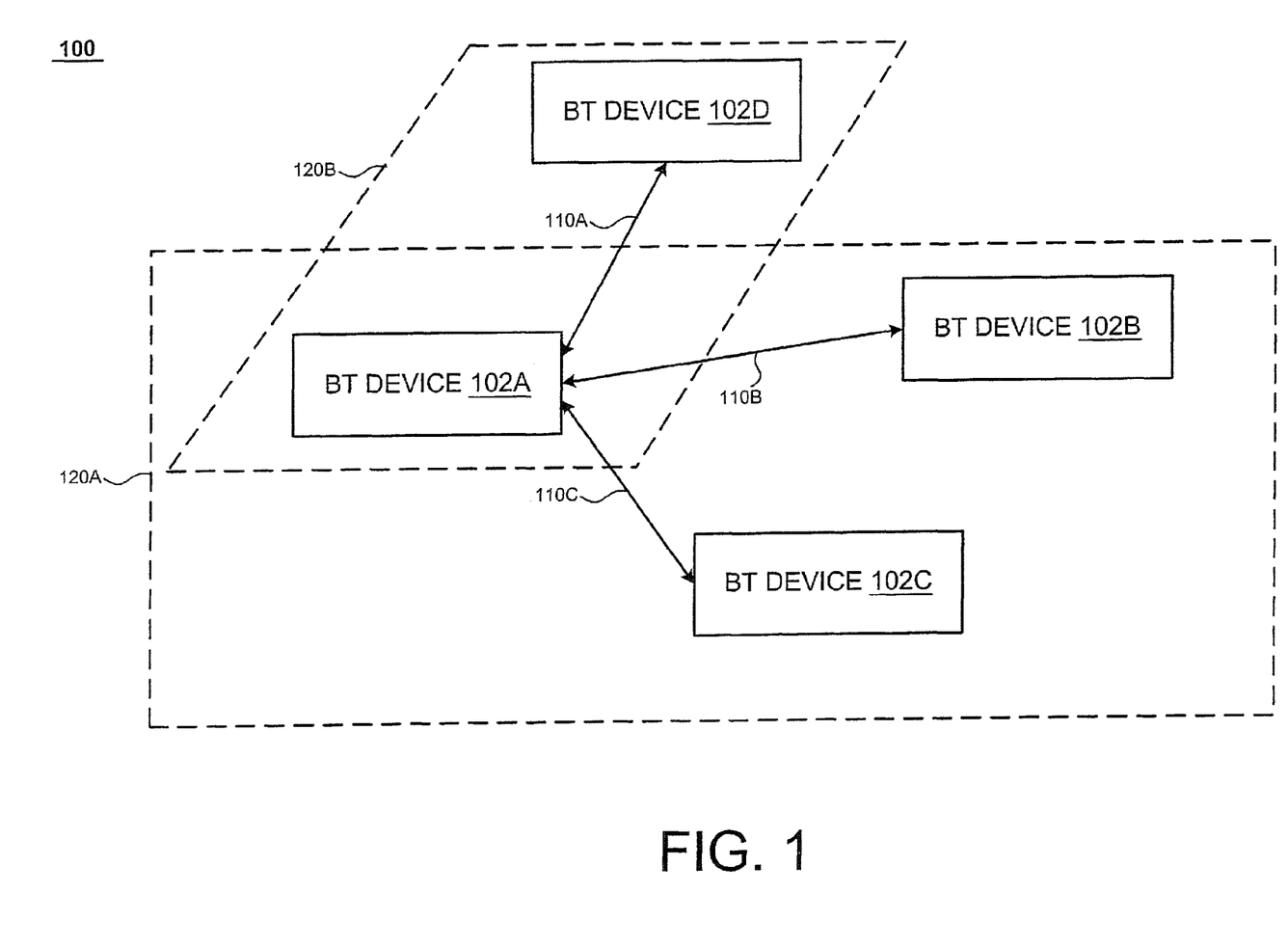
FIG. 1 depicts an example BT communications environment within which the present invention operates.

FIG. 1 depicts an example BT communications environment 100 according to an example embodiment of the present invention. Example BT communications environment 100 includes two or more BT devices 102 (shown as 102A, 102B, 102C, and 102D) that communicate with each other via a wireless link 110 (shown as 110A, 110B, and 110C). In FIG. 1, BT devices 102A, 102B, and 102C are in communication and form piconet 102A, while devices 102A and 120D form piconet 120B.

BT device 102 represents any device having BT capability according to the BT Specification. These devices can include, but are not limited to, mobile phones, laptop computers, desktop computers, printers, monitors, keyboards, PDAs, pagers, facsimile machines, and scanners. These devices can, for example, be equipped with a card or chip that provides BT communications capability.

Wireless link 110 represents any type of wireless communication medium. According to an example embodiment of the present invention, wireless link 110 represents a wireless radio frequency (RF) link wherein the connection is established and information is exchanged according to the BT Specification.

In this example BT network 100, BT device 102A acts as a master device to BT devices 102B, and 102C, which are slaves. As such, BT devices 102B and 102C synchronize their timing to that of BT device 102A. BT device 102A communicates with BT devices 102B and 102C via wireless links 110B and 110C, respectively.

In example BT communication environment 100, BT devices 102 may act as a master in one piconet 120, yet be a slave in another. This is illustrated in FIG. 1 in that BT device 102A acts as a master of BT devices 102B and 102C in piconet 120A, yet it acts as a slave to BT device 102D in piconet 1208. Consequently, in piconet 120B, BT device 102A synchronizes its timing to that of BT device 102D to facilitate communication among the devices. This communication occurs across wireless link 110A.

Figure 2:
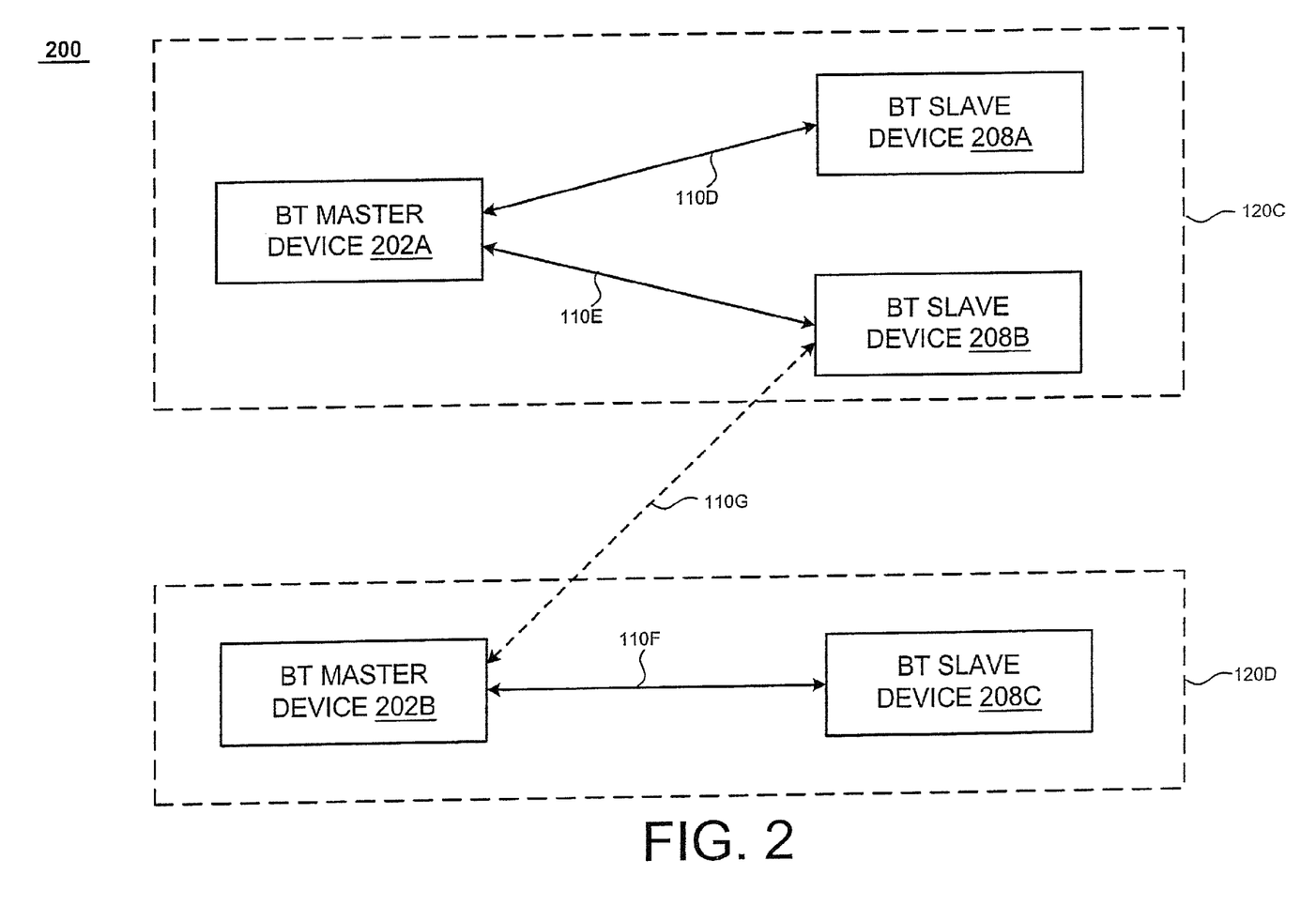
FIG. 2 illustrates handoff of a slave device between master devices.

FIG. 2 depicts a second example communications environment 200 according to the present invention illustrating handoff of a slave device from one master device to another. As shown in FIG. 2, a first piconet 120C includes a master device 202A in communication with two slave devices 208A and 208B via wireless links 110D and 110E, respectively. A second piconet 120D includes a master device 202B in communication with a slave device 208C via a wireless link 110F.

Master device 202 and slave device 208 represent devices acting in the role of master and slave as described in the BT Specification. They have 172 been labeled master and slave devices here for illustrative purposes. Master device 202A acts as a master device to slave devices 208A and 208B. Consequently, slave devices 208A and 208B synchronize their timing to that of master device 202A. Once slave devices 208A and 208B have synchronized their timing to master device 202A, master device 202A may communicate with slave devices 208A and 208B via wireless link 110D and 110E, respectively.

Similarly, master device 202B acts as a master to slave device 208C. As a result, slave device 208C synchronizes its timing to that of master device 202B to facilitate communication between the devices via wireless link 110F.

Now assume that slave device 208B is handed off from master device 202A to master device 202B. This handoff may stem from a number of causes. Slave device 208B may move or be moved out of master device 202A's transmit range into that of master device 202B, wireless link 110E may fail or be broken somehow, or master device 202A may itself fail or shut down.

Because master device 202B will now act as the master to slave device 208B, slave device 208B will have to synchronize its timing to that of master device 202B. However, up to this point in the handoff, slave device 208B has communicated with master device 202A using master device 202A's timing information. Consequently, this is the only timing made known to slave device 208B. Therefore, to facilitate the handoff, master device 202B initially communicates with slave device 208B using the timing of master device 202A. It does this to let slave device 208B know that slave device 208B now needs to synchronize its timing to the timing of master device 202B.

In order to complete the handoff, master device 202B should therefore obtain the timing information of master device 202A. Upon acquiring this information, master device 202B establishes wireless link 110G using the timing of master device 202A. Slave device 208B successfully receives this message because it is in the timing of its old master, i.e. master device 202A. Master device 202B then informs slave device 208B of master device 202B's timing, and slave device 208B synchronizes its timing to that of master device 202B. As a result, piconet 120D expands to include master device 202B, and slave devices 208B and 208C. Conversely, piconet 220A shrinks to include only master device 202A and slave device 208A.

Therefore, handoff efficiencies increase when, in a handoff situation, the new master device is aware of or has access to the timing information of the old master device so that the new master device may initially communicate with the handed-off slave device using the old master's timing.

Figure 3:
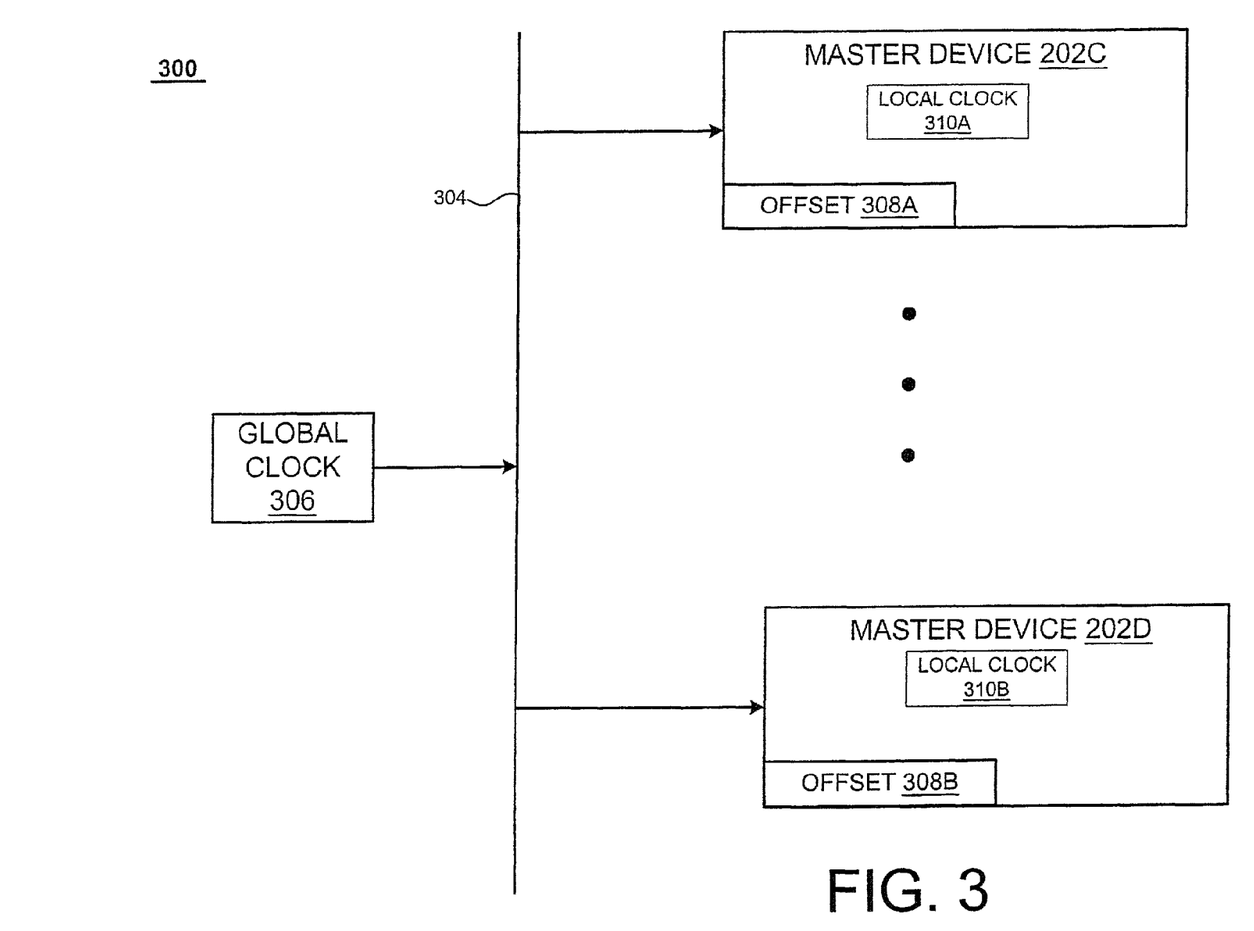
FIG. 3 is a schematic representation of a BT master device in more detail, wherein BT master devices are coupled to a global clock via a communication pathway.

FIG. 3 is an example configuration 300 showing this timing information according to an example embodiment of the present invention. The example configuration 300 includes a global clock 306, which is delivered via a communication pathway 304 to two or more master devices 202 (shown as 202C and 202D). Each master device 202 includes a local clock 310 (shown as 310A and 310B) and an offset 308 (shown as 308A and 308B).

In an example embodiment of the present invention, global clock 306 can represent a stand-alone free running clock. However, those of skill in the art will recognize that global clock can also be implemented using the local clock of one of the master devices 202 within example configuration 300.

Offset 308 represents a phase difference between global clock 306 and a local clock of master device 202. This difference may be predetermined and constant, or it may be realized by calculating the difference between the value of global clock 306 and that of an independent local clock of master device 202. When offset 308 is predetermined and constant, this predetermined value is used along with the value of global clock 306 to generate a local clock for master device 202. For example, the offset can be used to adjust the phase of the global clock. In the systems that implement clocks as an integer count, such as described in the BT Specification, the offset can be added to or subtracted from the current count to achieve a phase shift.

Communication pathway 304 represents any communication medium. This includes wired communication media such as a bus architecture or wireless media such as RF or infrared transmissions.

To reduce the possibility of interference, offset 308 is typically different in value from one master device 202 to another. For example offset 308A of master device 202A has a different value than offset 308B of master device 202B. This uniqueness of offset 308 prevents interference in the transmissions of master devices 202A and 202B.

According to various example embodiments of the present invention, efficient handoffs are facilitated by distributing offsets 308 via communication pathway 304 so that each master device 202 knows the offset 308 of other master devices 202 and can therefore communicate with a new slave in the old master device's timing. The following discussion will describe example embodiments of the present invention regarding the creation and distribution of offsets 308 in various network configurations. Specifically, the discussion will describe example embodiments of the present invention in terms of localized networks and distributed networks. Localized networks are networks in which master devices are physically located in close proximity to one another, for example, in a rack configuration. Conversely, distributed networks are those in which master devices are located in different geographic areas, for example, in different buildings on a college campus.

Localized Networks

Figure 4:
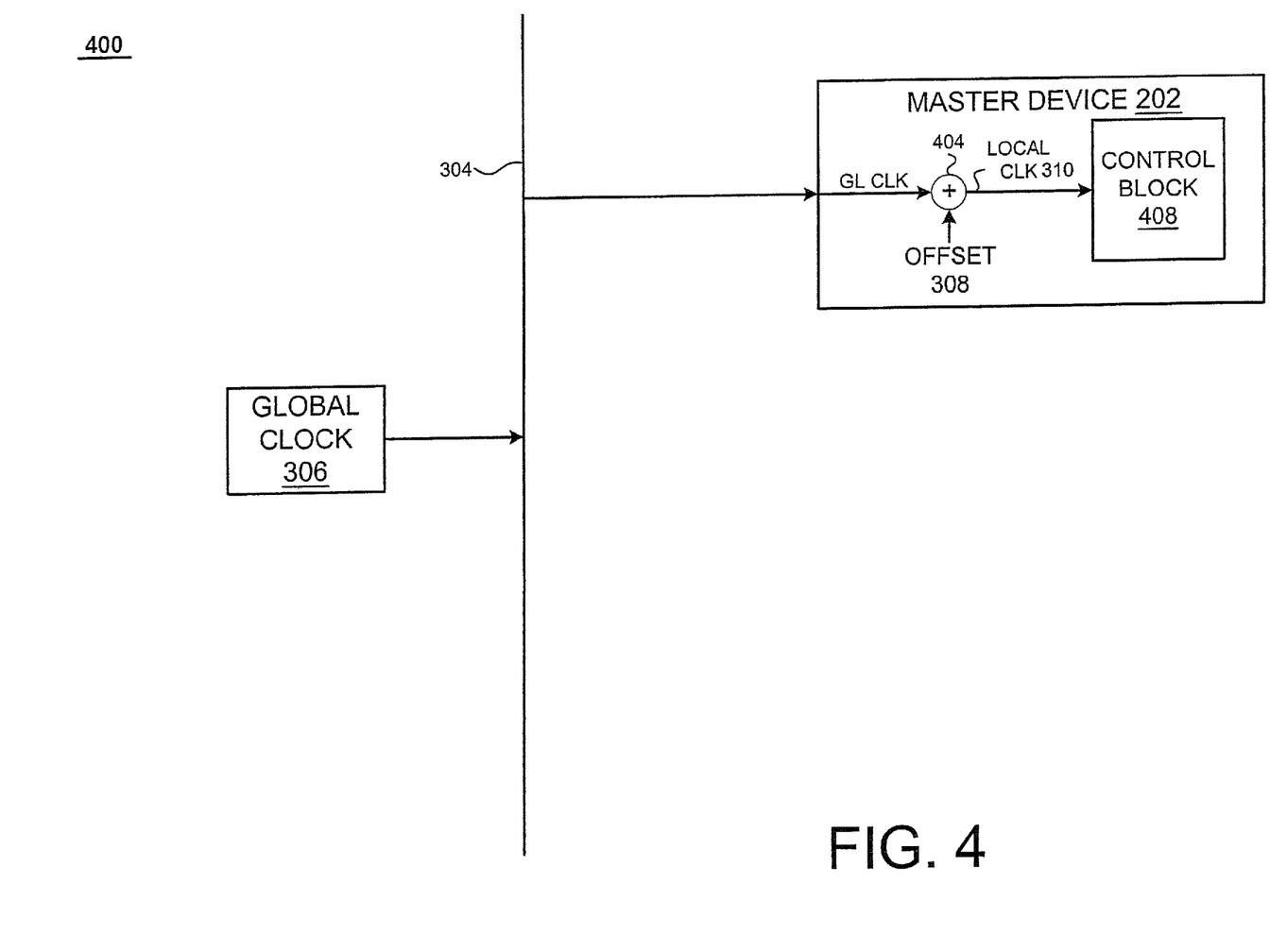
FIG. 4 is a schematic representation of a BT master device according to an example embodiment of the present invention, wherein an offset is added to the global clock to create a local clock.

FIG. 4 shows an example master device 202 in greater detail according to an example embodiment of the present invention. Master device 202 includes a control block 408, and an adder 404 to combine global clock 306 with offset 308 to form local clock 310. Local clock 310 in this example embodiment is derived using global clock 306 and offset 308 in that offset 308 is combined with global clock 306 to produce local clock 310. Adder 404 represents any mechanism, including hardware, software, or a combination of hardware and software for combining the value of global clock 306 with that of offset 308. As mentioned above, the combination of these values produces local clock 310 which is a phase-shifted version of global clock 306. Control block 408 represents a mechanism for controlling the communication activities of master device 202 in accordance with the BT Specification.

In this example, global clock 306 is input to master device 202 via communication pathway 304. Offset 308 is then combined by adder 404 with global clock 306 to create local clock 310. As described above, any slave device 208 in communication with master device 202 will have to synchronize its timing with local clock 310. The value of offset 308 can be unique to master device 202, and may, in particular example embodiments according to the present invention, be predetermined and constant.

Figure 5:
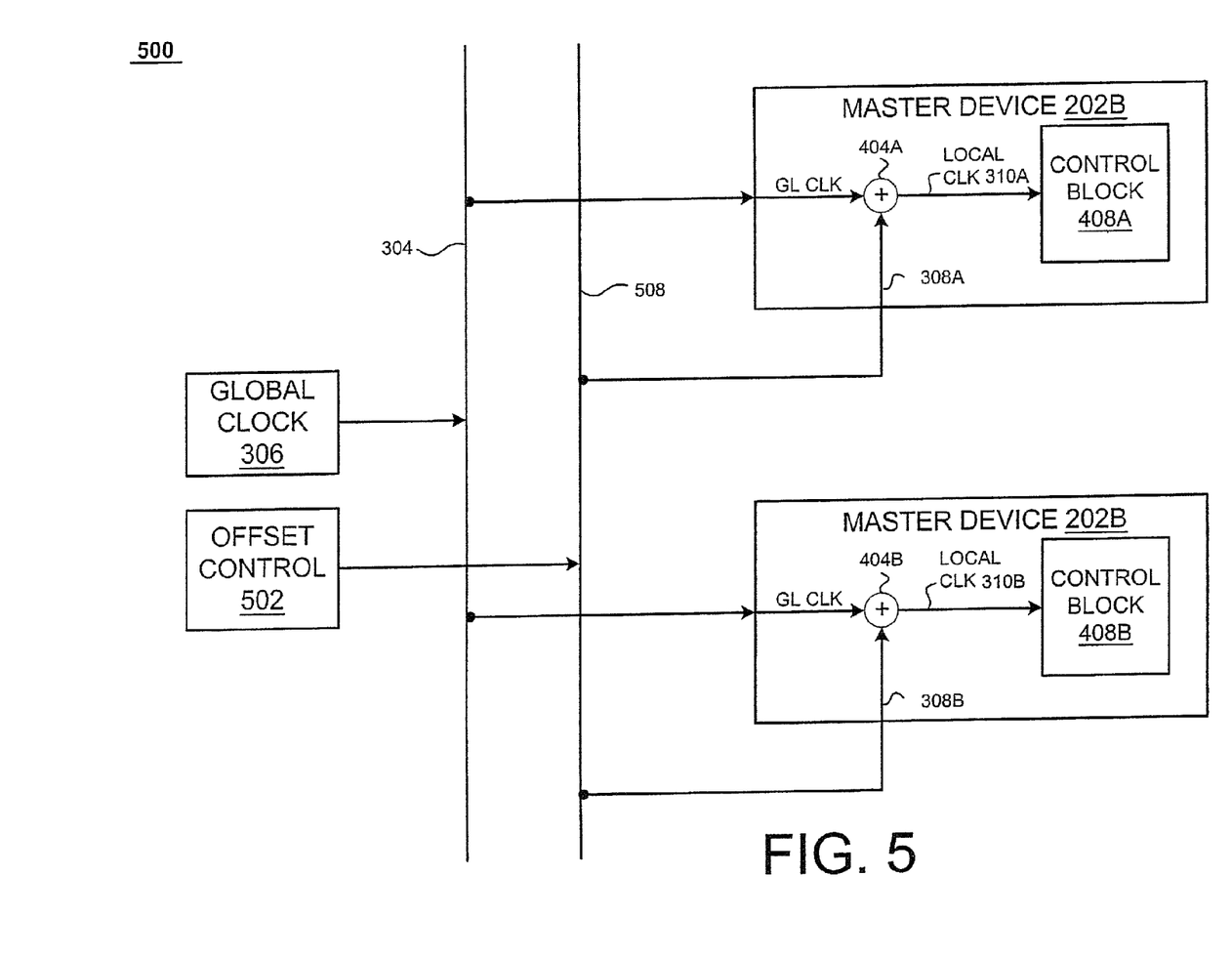
FIG. 5 is a schematic representation of another example embodiment of the present invention, wherein offsets are provided by an offset control.

FIG. 5 illustrates an example network 500 having an offset control 502 and an offset communication pathway 508 added to configuration 400. Offset control 502 provides values of offsets 308, via offset pathway 508, to master devices 202. Offset control may be implemented as hardware, software, or any combination of hardware and software and may be located or stored at a remote location accessible via offset communication pathway 508 or within a master device 202. Offset communication pathway 508 represents any communication medium, including wired and/or wireless communication connections. Those of skill in the art will recognize that communication pathway 304 may also perform the functionality of offset communication pathway 508.

According to an example embodiment of the present invention, example network 500 is made up of master devices 202 in a localized network, that is, located in relatively close physical proximity, as in a rack configuration. Here, communication pathway 304 and offset communication pathway 508 can be implemented using, for example, a bus or other wire line connection. Further, master devices 202, global clock 306, and offset control 502 can be implemented, for example, as one or more cards plugged into the bus. Offset control 502 establishes offsets 308A and 308B for master devices 202A and 202B, respectively, and distributes them to master devices 202A and 202B. The value of offset 308A is different from that of offset 308B. As was described above with reference to FIG. 4, global clock 306 is input to each master device 202 via communication pathway 304.

As shown in FIG. 5, adders 404A and 404B combine offsets 308A and 308B with global clock 304. This combination creates local clocks 310A and 310B, which also have different values because of the different values of offsets 308A and 308B. As described above, any slave devices 208 in communication with master devices 202A and 202B will have to synchronize their timing with local clock 310A and 310B, respectively. Since offset control 502 determines offsets 308 for each of master devices 202, it knows the value of offsets 308 for each of the master devices 202. Therefore, when master device 202A, for example, needs offset 308B of master device 202B, to, for example, effect a handoff, master device 202A can receive the necessary offset information from offset control 502. Those of skill in the art will recognize that offset control 502 may distribute offset 308 of one master device 202 to another in a number of ways. For example, offset control 502 can provide offset 308 of one master device 202 to another when master device 202 requests the information. Or, offset control 502 can inform master devices 202 of offsets 308 of other master devices 202 when providing master device 202 with its particular offset 308.

Figure 6:
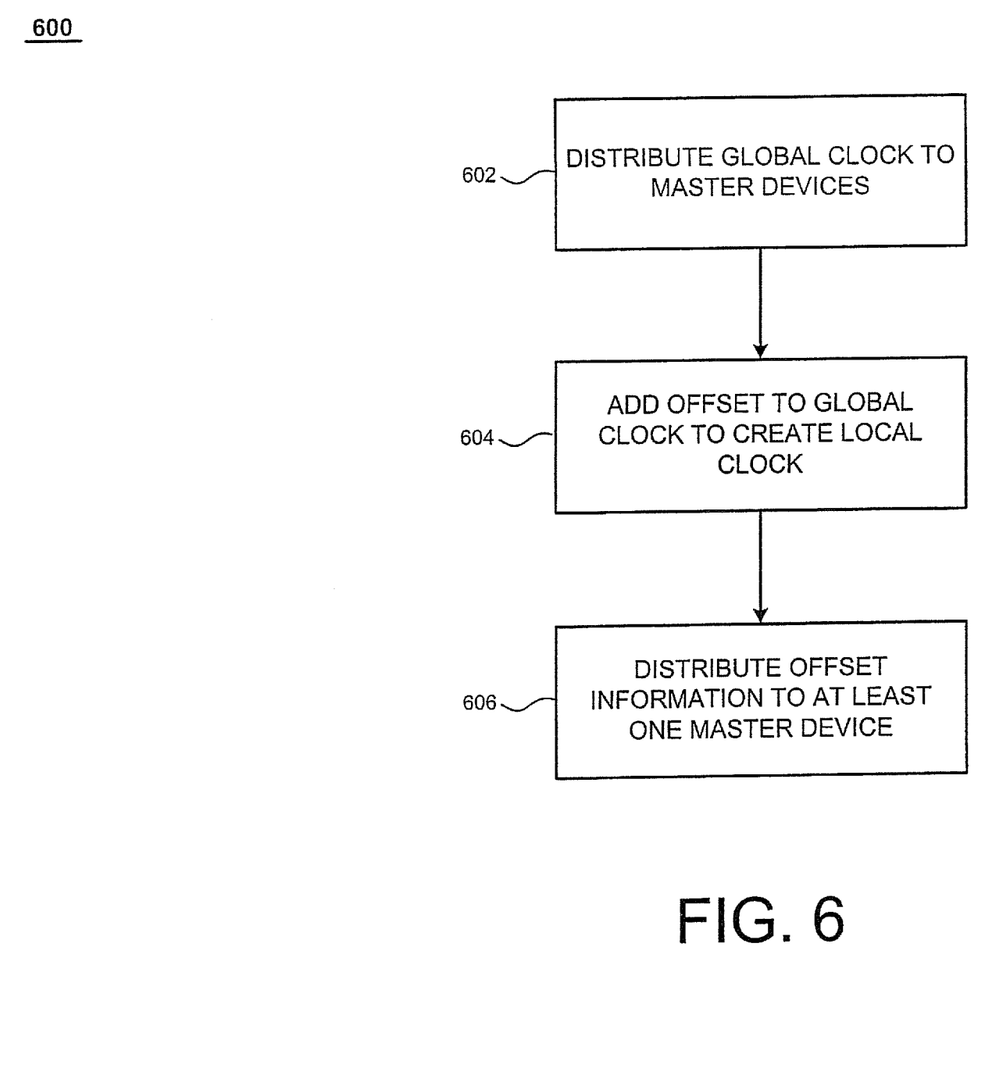
FIG. 6 is a flowchart that describes a method according to an example embodiment of the present invention for operation in a localized BT network.

FIG. 6 is a flowchart 600 that describes the operation of an example embodiment of the present invention in which local clock 310 of each master device 202 is derived by adding offset 308 to global clock 306. In operation 602, global clock 306 is distributed to master devices 202. As shown in FIGS. 3, 4, and 5, global clock 306 is distributed to master devices 202 via communication pathway 304.

In operation 604, offset 308 is added to global clock 306 to create local clock 310 used by master device 202. As shown in FIGS. 4 and 5, adder 404 combines global clock 306 and offset 308 to generate local clock 310. FIGS. 4 and 5 also show that offset 308 is distributed to master devices 202 from offset control 502 via offset communication pathway 508.

In operation 606, offset 308 is distributed to at least one master device 202. This distribution allows master devices 202 to efficiently acquire offset 308 of other master devices 202 when handoff of a slave device from one master device 202 to another is required.

Referring back to FIG. 2, this method will allow efficient hand off of slave device 208B from master device 202A to master device 202B. This is true because offset 308A of master device 202A will be distributed to master device 202B so that this new master device will be able to communicate to slave device 208A to inform it that it needs to now synchronize its timing to that of master device 202B. As described above, this distribution may be done in a number of ways.

The configuration of FIG. 4 allows the use of a single global clock 306 to create local clocks 310. This is because the master devices 202 are in close proximity of global clock 306 and distribution of global clock 306 to the master devices 202 is less hindered by distance.

Distributed Networks

Figure 7:
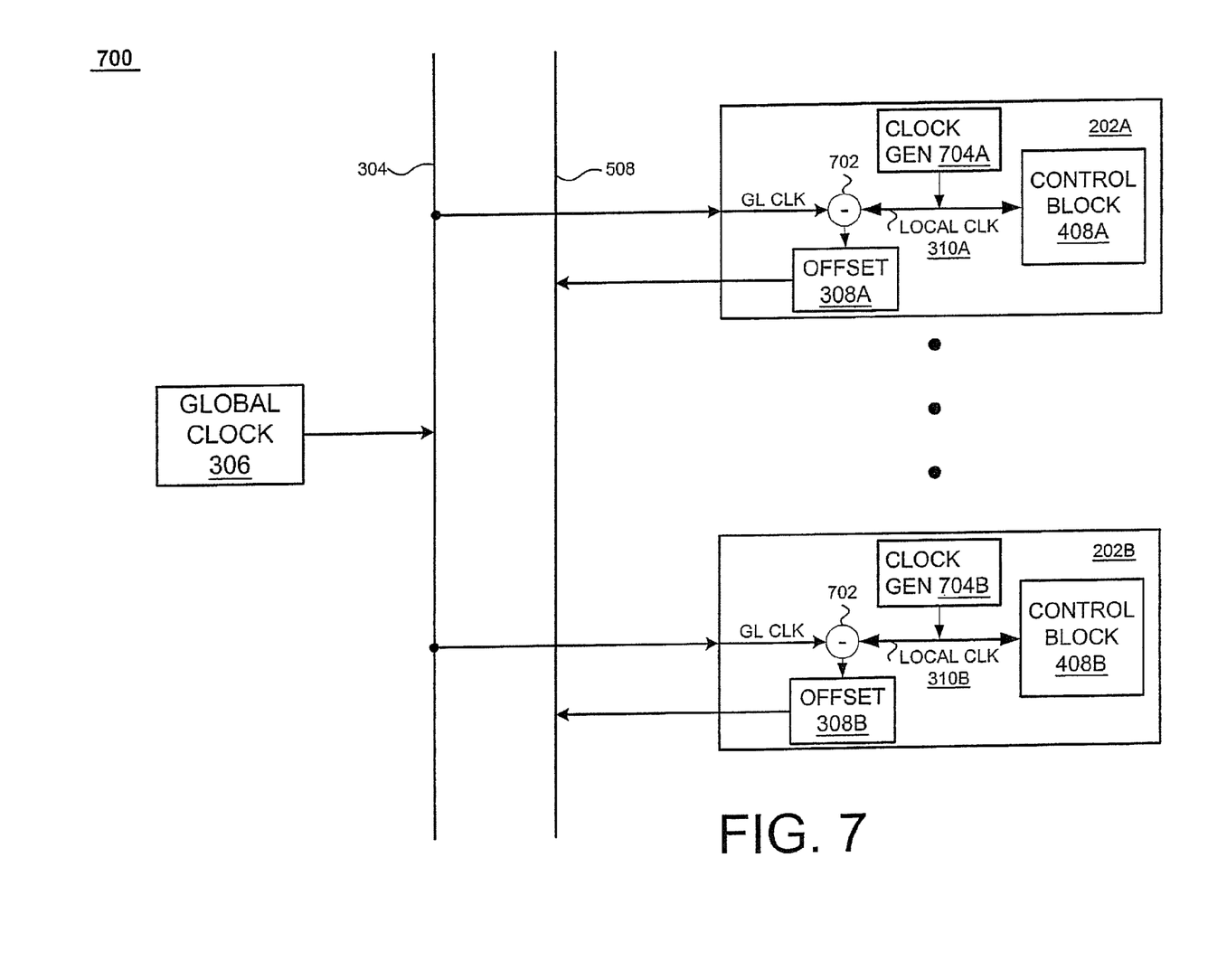
FIG. 7 is a schematic representation of yet another example embodiment of the present invention, wherein an offset is determined at each master device using a global clock and a local clock generated at the master device.

The previous embodiments are most applicable to localized networks in which the master devices are in relatively close physical proximity. FIG. 7 depicts a network 700 according to an example embodiment of the present invention that may be used in distributed networks in which master devices 202 are located remotely from one another. In this example embodiment, each master device 202 includes a local clock generator 704 (shown as 704A and 704B), local clock 310 (shown as 310A and 310B). Local clock 310 is compared with global clock 306 to determine offset 308 (shown as 308A and 308B).

Local clock generator 704 represents a clocking mechanism that generates local clock 310 for a particular master device 202. Those of skill in the art will recognize that local clock 310 can be implemented as a crystal oscillator that runs independent of global clock 306.

According to the exemplary embodiment of FIG. 7, global clock 306 is fed into master devices 202A and 202B as previously described with reference to FIGS. 4 and 5. However, unlike the configuration of FIGS. 4 and 5, each master device 202 generates its own local clock 310 independent from global clock 306. This is possible because each master device 202 has its own crystal oscillator generating its unique local clock 310. Then, based on local clock 310 and global clock 306, each master device 202 determines its offset 308 by calculating the difference between global clock 306 and its own local clock 310. Local clock generator 704 will, in all likelihood, generate a local clock having a phase different from that of local clock 310B. Consequently, offset 308A will be different from offset 308B. Recall that interference is minimized when offsets 308 of master devices are different from one another. Thus, in this example embodiment of FIG. 7, as with the example embodiment previously described with reference to FIGS. 4 and 5, each offset 308 should be unique to each master device 202.

Figure 8:
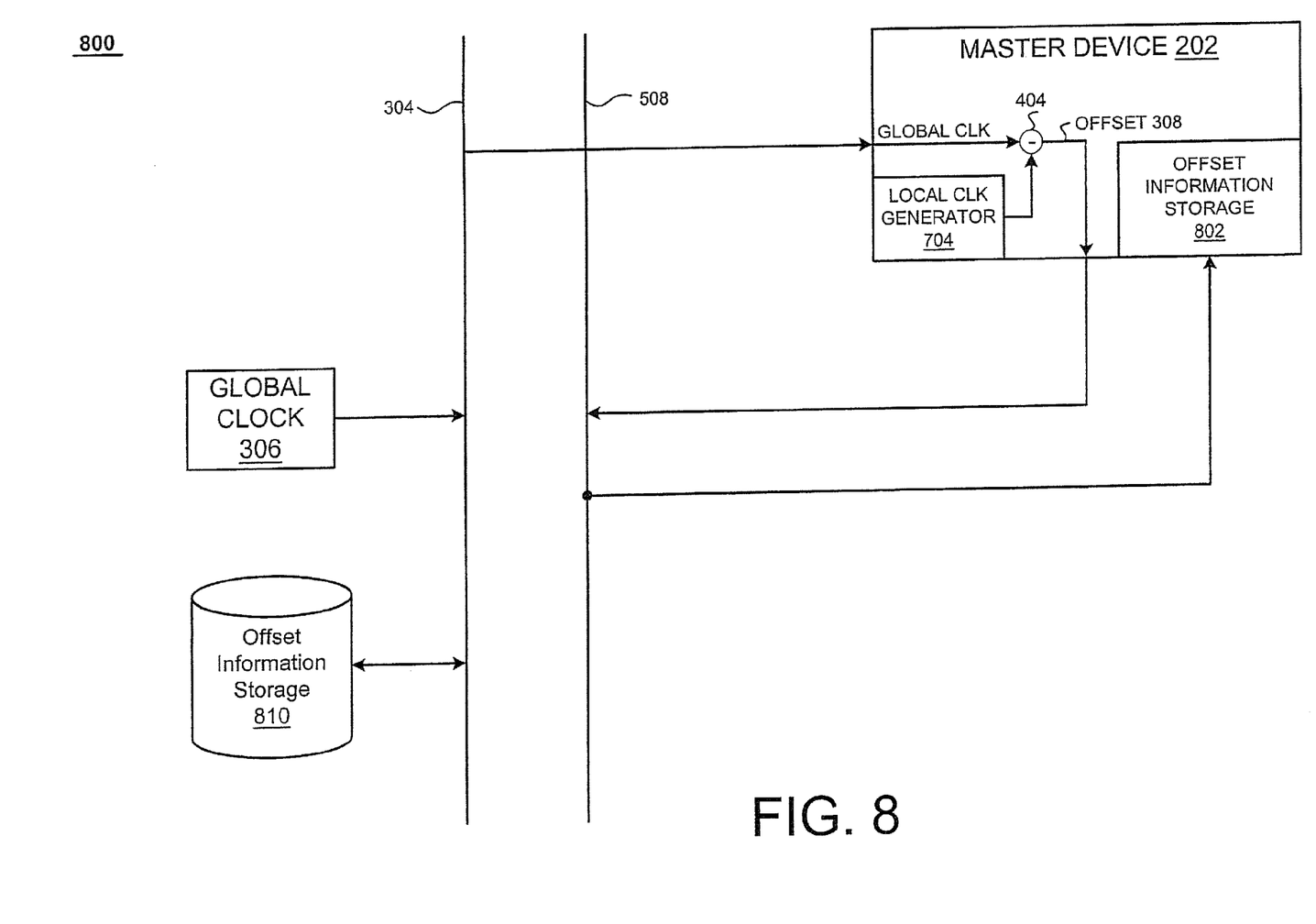
FIG. 8 depicts an example embodiment of the present invention shown in FIG. 7, wherein offset information is stored in an offset information storage.

FIG. 8 depicts a more detailed representation of master device 202 of FIG. 7. As shown, master device 202 includes localized offset information storage 802 and central offset storage 810.

Offset information storage 802 represents memory for storing the offsets 308 from other master devices 202 in network 800. As described above, this offset information is used by master device 202 when effecting a handoff. Offset information storage 802 can be used to store a particular offset 308 that is requested by a master device when needed to complete a handoff. Offset information storage 802 can also be used to store offsets 308 corresponding to one or more other master deices 202 that is stored locally for convenient accessibility if needed for a future handoff. Offset information storage 802 may be implemented using hardware, software, or any combination of hardware or software.

Similarly, central offset storage 810 may be used in lieu of or in addition to offset information storage 802 to store offset information of master devices 202 for distribution or retrieval by master devices 202 involved in a handoff. It, too, may be implemented using hardware, software, or a combination of hardware and software.

In this example embodiment of the present invention, offset 308 may be distributed, via offset communication pathway 508, in a number of ways. For example, master device 202 may intermittently post its offset 308 on offset communication pathway 508 and intermittently retrieve offsets 308 for the other master devices 202 and store this information in localized offset storage bank 802. This allows master devices 202 to possess offsets 308 of other master devices which facilitates efficient handoffs should the need arise.

In addition to this form of distribution, offset 308 may be stored in central offset storage and retrieved on demand, i.e., master device 202 will post its offset 308 for retrieval by another master device only when the retrieving master device requests it. Also, rather than each master device 202 storing offset 308 information for all other master devices, this information could be stored in a central location on the network. Also, rather than intermittently posting and retrieving offsets 308, this could be done on a continuous basis.

Figure 9:
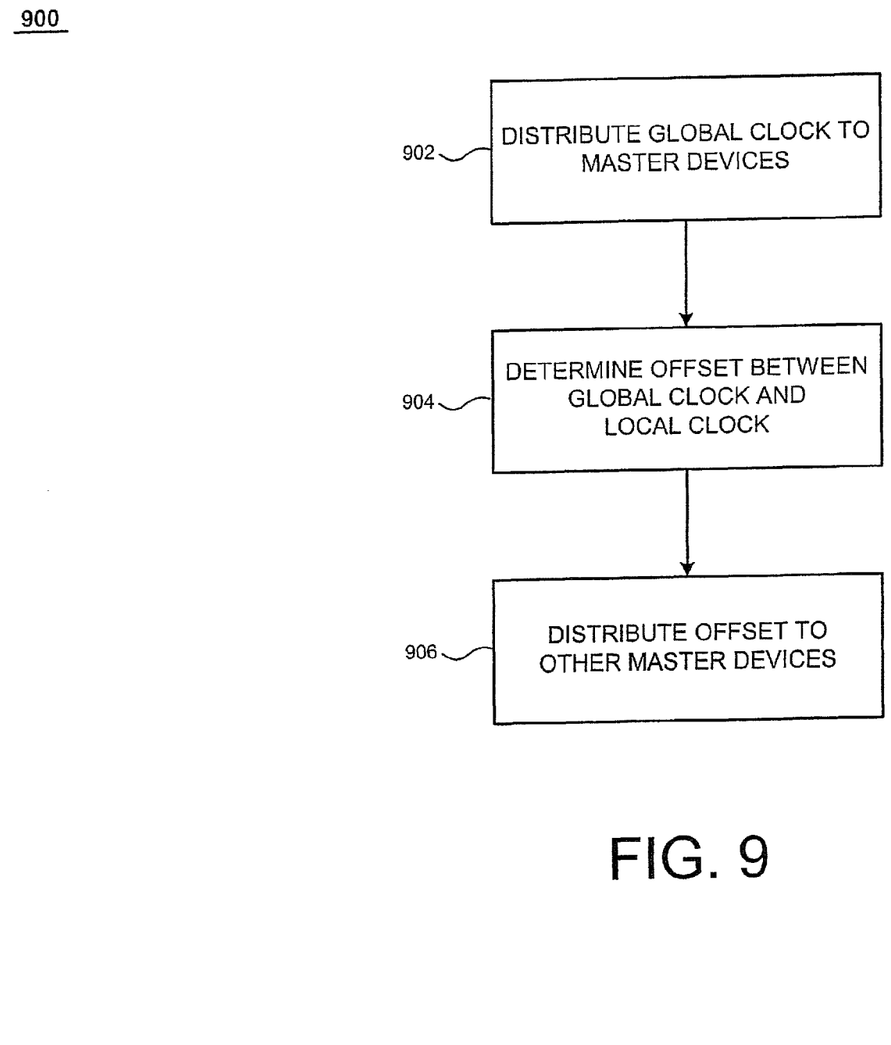
FIG. 9 is a flowchart that describes a method according to an example embodiment of the present invention for operation in a distributed BT network.

FIG. 9 is a flowchart 900 describing the operation of an example embodiment of the present invention in which each master device 202 in a network has its own local clock 310. In operation 902, global clock 306 is distributed to two or more master devices 202. As shown in FIGS. 7 and 8, this distribution is via communication pathway 304 and may be done in a number of ways. In operation 904, offset 308 is determined by calculating the difference between global clock 306 and local clock 310. This may be done using adder 404 as shown in FIG. 8. In operation 906, offset 308 is distributed to at least one of the plurality of master devices 202. As mentioned above, this distribution may be done in a number of ways, and as shown in FIGS. 7 and 8, is carried out over offset communication pathway 508.

As mentioned above, this example embodiment of the present invention is most applicable to a distributed network. In the configuration of FIG. 9, master devices 202 are distributed over a geographical area such as a college campus, a shopping mall, or a business facility. Master devices 202 generate their own local clock 310 and offset 308 based on the difference between global clock 306 and their local clock 310. The master devices 202 then distribute their offset 308 to other master devices 202 in the manner described above. This distribution is typically done via offset communication pathway 508, or may be done via communication pathway 304. Communication pathway 304 and offset communication pathway 508 may be implemented as a wired network or as a wireless network, and can be implemented as a single or multiple networks. The distribution described above allows for efficient handoffs when a slave device 208 moves from, for example, one area of the distributed network to another, for example.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for distributing timing information amongst a plurality of Bluetooth master devices, comprising:
    transmitting a global clock to each master device of the plurality of master devices, wherein each master device comprises a Bluetooth master device and is a master of a respective piconet, wherein each master device of the plurality of master devices operates according to a respective and unique local clock that is independent of the global clock, wherein a slave device communicates with a first master device of the plurality of master devices by synchronizing with the respective local clock of the first master device, and wherein the slave device comprises a Bluetooth slave device;
    determining, in each master device, a respective offset between the global clock and the respective local clock, wherein the respective offsets are different from each other; and
    transmitting the respective offset of the first master device of the plurality of master devices to a second master device of the plurality of master devices to facilitate a handoff of the slave device from the first master device to the second master device.

2. The method according to claim 1, wherein the global clock comprises a local clock of one of the plurality of master devices.

3. The method according to claim 1, wherein the respective offset of the first master device is distributed over a communication pathway linking the first master device to the second master device.

4. The method according to claim 3, wherein the communication pathway comprises a wired communication pathway.

5. The method according to claim 3, wherein the communication pathway comprises a wireless communication pathway.

6. The method according to claim 1, wherein each master device transmits the respective offset to a central storage device, and wherein each master device can request, from the central storage device, the respective offsets of other master devices of the plurality of master devices.

7. The method according to claim 1, wherein the second master device requests the respective offset of the first master device, and wherein the first master device transmits the respective offset to the second master device.

8. The method according to claim 1, wherein each master device stores respective offsets of other master devices of the plurality of master devices to effect handoffs of slave devices.

9. The method according to claim 1, wherein the first master device comprises a first mobile phone configured to act as a first master in a first piconet, and wherein the second master device comprises one of a second mobile phone, a printer and a computer, the second master being configured to act as a second master in a second piconet.

10. The method according to claim 1, wherein each master device intermittently transmits the respective offset and intermittently receives the respective offsets of the other master devices of the plurality of master devices.

11. A method for distributing timing information amongst of a plurality of Bluetooth master devices, comprising:
    transmitting a global clock to each master device of the plurality of master devices, wherein each master device comprises a Bluetooth master device and is a master of a respective piconet;
    transmitting, to each master device, a respective and unique offset;
    generating, in each master device, a respective local clock using the respective offset and the global clock, wherein the respective local clock is used by a first master device of the plurality of master devices to communicate with a slave device in the respective piconet of the first master device, and wherein the slave device comprises a Bluetooth slave device; and
    transmitting the respective offset of the first master device to a second master device of the plurality of master devices to facilitate a wireless handoff of the slave device from the first master device to the second master device.

12. The method according to claim 11, wherein each of the master devices comprises a local oscillator, and wherein the global clock comprises a clock signal generated by the local oscillator associated with one of the plurality of master devices.

13. The method according to claim 11, wherein the respective offsets are stored in a central location and provided to at least two of the master devices.

14. The method according to claim 11, wherein the respective offset of the first master device is stored locally at the second master device.

15. The method according to claim 11, wherein the first master device comprises a first mobile phone configured to act as a first master in a first piconet, and wherein the second master device comprises one of a second mobile phone, a printer and a computer, the second master being configured to act as a second master in a second piconet.

16. The method according to claim 11, wherein the respective offsets of the plurality of master devices are predetermined and constant.

17. A communication system that uses Bluetooth communication, comprising:
    a global clock transmitting, over a first communication pathway, a global clock signal to each master device of a plurality of master devices; and
    each master device of the plurality of master devices comprising a respective local clock generator that generates a respective and unique local clock and a respective memory that stores a respective offset, wherein each master device determines the respective offset from the global clock and the respective local clock, wherein each master device comprises a Bluetooth master device and is a master of a respective piconet, wherein a first master device of the plurality of master devices transmits, over a second communication pathway, its respective offset to a second master device of the plurality of master devices to facilitate a wireless handoff of a slave device from the first master device in a first piconet to the second master device in a second piconet, wherein the slave device comprises a Bluetooth slave device, wherein the slave device is synchronized with the respective local clock of the first master device, and wherein the respective offset of the first master device is used by the second master device to communicate with the slave device.

18. The system according to claim 17, wherein the first communication pathway comprises a first wireless communication pathway, and wherein the second communication pathway comprises a second wireless communication pathway.

19. The system according to claim 17, wherein the respective offsets of the plurality of master devices are stored in a central offset storage device.

20. The system according to claim 17, wherein the global clock comprises one of the respective local clocks of the plurality of master devices.

21. The system according to claim 17, wherein the second master device requests the respective offset of the first master device, stores the respective offset of the first master device in the respective memory of the second master device, and uses the respective offset of the first master device to communicate with the slave device.

22. The system according to claim 17, wherein the respective offsets are distributed by a central offset storage device upon request by one of the master devices.

23. The system according to claim 17, wherein the respective memory of the second master device stores the respective offset of the first master device and the respective offsets of other master devices of the plurality of master devices.

24. The system according to claim 17, wherein the first master device comprises a first mobile phone configured to act as a first master in the first piconet, and wherein the second master device comprises one of a second mobile phone, a printer and a computer, the second master being configured to act as a second master in the second piconet.

25. The system according to claim 17, wherein each master device intermittently posts the respective offset on the second communication pathway, and wherein each master device intermittently receives, via the second communication pathway, the respective offsets of the other master devices of the plurality of master devices.

26. A communication system that uses Bluetooth communication, comprising:

a global clock that transmits, over a first communication pathway, a global clock signal to each master device of a plurality of master devices, wherein each master device comprises a Bluetooth master device and is a master of a respective piconet; and an offset control that transmits, over a second communication pathway, a respective and unique offset signal to each master device, wherein each master device comprises a respective local clock generator that generates a respective local clock signal as a function of the respective offset signal and the global clock signal, wherein the respective local clock signal of a first master device of the plurality of master devices is used by the first master device to synchronize communication with a slave device, wherein the slave device comprises a Bluetooth slave device, and wherein the respective offset signal of the first master device is transmitted to a second master device of the plurality of master devices to facilitate a wireless handoff of the slave device from the first master device in a first piconet to the second master device in a second piconet.

27. The system according to claim 26, wherein the first communication pathway comprises a first wired communication pathway, and wherein the second communication pathway comprises a second wired communication pathway.

28. The system according to claim 26, wherein the first communication pathway comprises a first wireless communication pathway, and wherein the second communication pathway comprises a second wireless communication pathway.

29. The system according to claim 26, wherein the global clock generates a single global clock signal that is used by each master device, and wherein the single global clock signal is generated by one of the clock generators of the plurality of master devices.

30. The system of claim 26, further comprising a memory that is operatively coupled to the second communication pathway, wherein the offsets are stored in the memory.

31. The system according to claim 26, wherein each master device receives the respective offset for each of the other master devices.

32. The system according to claim 26, wherein each of the master devices comprises a local memory for storing offsets associated with at least one of the master devices.

33. The system according to claim 26, wherein the first master device comprises a first mobile phone configured to act as a first master in the first piconet, and wherein the second master device comprises one of a second mobile phone, a printer and a computer, the second master being configured to act as a second master in the second piconet.

34. The system according to claim 26, wherein the first communication pathway comprises a bus that is operatively coupled to a first card and to a second card, wherein the first master device is part of the first card, and wherein the second master device is part of the second card.

* * * * *